United States Patent [19]
Jeffery et al.

[11] 3,729,671
[45] Apr. 24, 1973

[54] POWER CONTROL AND SUPERVISORY SYSTEM

[75] Inventors: Thomas H. Jeffery, Oak Park; Karl H. Kuster, Glendale Heights, both of Ill.

[73] Assignee: GTE Automatic Electric Laboratories Incorporated, Northlake, Ill.

[22] Filed: Mar. 22, 1972

[21] Appl. No.: 236,729

[52] U.S. Cl.....................................321/11, 317/16
[51] Int. Cl..............................................H02m 1/18
[58] Field of Search.......................................317/16; 321/11–14

[56] References Cited

UNITED STATES PATENTS

| | | | |
|---|---|---|---|
| 3,225,257 | 12/1965 | Fegley | 317/16 X |
| 3,046,412 | 7/1962 | Seike | 321/14 X |
| 3,449,634 | 6/1969 | Hung | 317/16 X |
| 3,579,036 | 5/1971 | McCoy | 317/16 |

*Primary Examiner*—William M. Shoop, Jr.
*Attorney*—K. Mullerheim et al.

[57] ABSTRACT

There is herein disclosed an electrical power control and supervisory system for monitoring the outputs of a plurality of regulated power converters and generating error signals which are fed back to control the converter outputs and provide power on/off control signals to properly sequence the application and removal of power to solid state logic circuitry.

7 Claims, 15 Drawing Figures

POWER CONTROL AND SUPERVISORY SYSTEM

BACKGROUND OF THE INVENTION

1. Field of the Invention

The present invention relates generally to the field of electrical power supplies and more particularly to a new and improved closed loop power control and supervisory system for use with solid state circuitry.

2. Description of the Prior Art

Many modern electronic systems contain thousands of solid state logic circuits in either integrated circuit or discrete component form. While individual logic circuits dissipate power in the milliwatt range the total power drain in a large system may be on the order of tens of kilowatts. In providing electrical power to such systems it is typically necessary to derive all power for the system from some input power source with a high degree of power conversion efficiency and to meet the low percentage voltage tolerances of the individual logic circuits. In many cases it is also necessary to provide uninterrupted power to the logic even during a commercial power outage and to furnish automatic power shutdown in cases of certain power and abnormalities as well as alarm and supervisory signals to indicate the status of power in the electronic system.

The foregoing requirements present particular problems when the electronic system is a telephone switching system. To satisfy the uninterrupted power supply requirement of the electronic switching system, power is derived from a −50 vdc office battery, commonly available in the telephone plant, by means of regulated dc-to-dc converters. This same battery supply must generally be shared with electromechanical apparatus such as relays, crosspoint switches and rotary switches as well as with carrier equipment. The electromechanical components produce an electrical environment which is particularly hostile for high speed logic circuitry since large transient voltages may be generated when spark suppression apparatus fails and electrical noise on the office battery must be greatly attenuated by the power conversion and conditioning equipment. The office battery voltage at the input of any given equipment frame may typically vary as much as 20 percent whereas logic circuitry generally requires input voltages to be regulated to within ± 5 percent. When allowance is made for distribution voltage drops it is required that the dc-to-dc converter output voltages must be regulated with considerable precision against variations in the input battery voltage, variations in the converter output load current as well as variations in the ambient temperature around the converter.

A further problem common to electronic switching systems arises in that electronic frame which share a common data bus must have power applied and removed in specified sequences not only to protect the hardware but to protect data transmission over the shared busses against masking by erroneous data bits which tend to occur when common hardware experiences the application, removal or partial failure of power.

Prior to the present invention power control systems were typically of the open loop variety; i.e., when an abnormal output voltage was sensed the system simply signalled for the intervention of maintenance personnel. The failure to manually intervene in the operation of the system had drastic consequences which will readily be appreciated. The prior systems further depended for power sequencing upon a timing generator or a special manual switching arrangement. With these systems under a power system fault condition the proper power removal sequence could not be salvaged.

OBJECTS AND SUMMARY OF THE INVENTION

From the preceding discussion it will be understood that among the various objectives of the present invention are included:

the provision of a new and novel power control and supervisory system;

the provision of apparatus of the above-described character wherein power control and sequencing is obtained through use of a closed loop monitoring system;

the provision of apparatus of the above-described character wherein the requirement for a timing generator is eliminated; and the provision of apparatus of the above-described character which controls electrical power within tolerances consistent with high speed solid state logic circuitry.

These and other objects of the present invention are efficiently achieved by providing a plurality of regulated power converters the operation of which is under the control of the system control logic. A voltage monitor is coupled to the output of each converter to sample the output power levels and develop error signals in response to over or under voltage conditions. The error signals are fed back to the control logic which in turn adjusts the converter operation to maintain output power levels within selected limits. The voltage monitor further operates in cooperation with the control logic to apply and remove input power to the converters in a preselected sequence and to provide power system status information.

The foregoing as well as other objects, features and advantages of the present invention will become more apparent from the following detailed description taken in conjunction with the various views of the appended drawings.

DESCRIPTION OF THE PREFERRED EMBODIMENT

For convenience of discussion the power control and supervisory system of the present invention will be discussed in the application to an electronic telephone switching system wherein the input power source is assumed to be the −50 vdc central office battery. It will be understood, however, that the principles of the invention are of much wider applicability to the control and supervision of electrical power in electronic systems in general.

Figure 1:
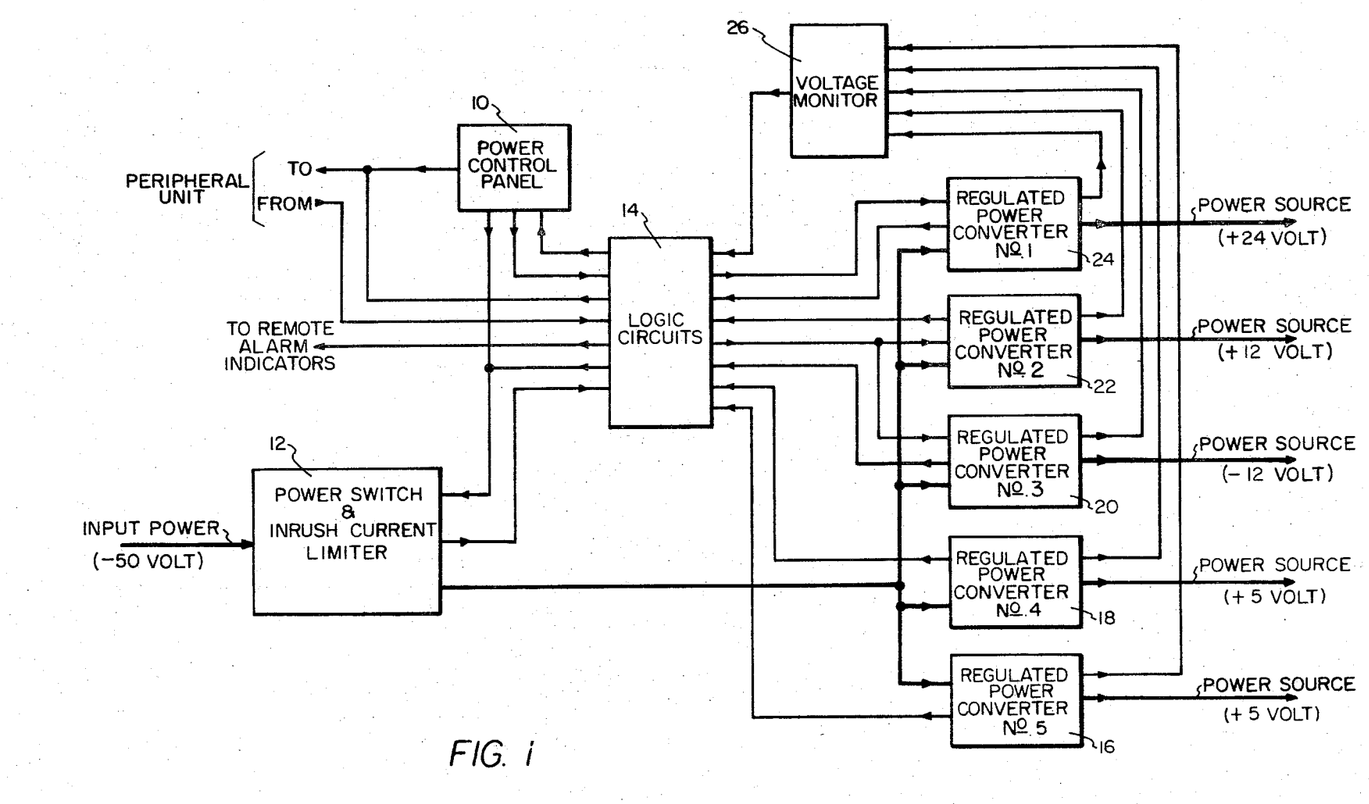
FIG. 1 is a functional block diagram of an electrical power control and supervisory system constructed in accordance with the principles of the present invention.

With reference now to FIG. 1 there is shown a functional block diagram of the present invention. Throughout this specification the heavier lines are intended to represent electrical power flow and the lighter lines the control signal flow.

Any manually initiated change in the state of power will originate in a power control panel 10 which will include conventional on/off and status change switches as well as system status indicators including lights and alarms. For an OFF to ON change in the state of power, manual ON signal levels to the power switch 12 and the logic circuits 14 allow the application of power to all regulated power converters 16–24. In this example, only regulated power converters 16 and 18 can build-up their output voltages; regulated power converters 20, 22 and 24 are inhibited by signal levels from the logic circuits 14, originating from the voltage monitor 26 and indicating that output voltage of the regulated power converters 16 and 18 are not within acceptable, specified limits. As the output voltages of regulated power converters 16 and 18 reach their nominal values, the voltage monitor 26 alters signal levels to the logic circuits 14 which now remove the inhibit signal levels to regulated power converters 20 and 22, allowing their output voltages to build-up. As the output voltages of these regulated power converters reach their nominal values, the voltage monitor 26 alters signal levels to the logic circuits 14 which now remove the inhibit signal level to regulated power converter 24, allowing its output voltage to build-up. As the output voltage of regulated power converter 24 reaches its nominal value, the voltage monitor 26 alters a signal level to the logic circuits 14 which, in turn latch-up the power switch 12, making the manual ON signal levels from the power control panel 10 to the power switch 12 and the logic circuits 14 unnecessary.

For an ON to OFF change in the state of power, a manual request signal level goes to a peripheral unit (not shown) from which an out of service signal level returns to the logic circuits 14 (after a time interval) before a manual OFF signal level from the power control panel 10 to the logic circuits 14 start the removal of power from all regulated power converters 16–24. If, however, the central processor cannot send an out of service signal level, via the peripheral equipment, (e.g., in the case where the mating, duplicated equipment frame, is off-line) before the removal of power is started, an alarm signal level will be generated by the logic circuits 14. The alarm signal level is displayed on the power control panel 10 along with the out of service signal level from the peripheral unit, which indicates the state of the frame's use (in service or out of service). After the logic circuits 14 have received the power removal signal level from the power control panel 10, a crowbar signal level is sent to regulated power converter 24 which crowbars its output voltage; i.e., removes the output voltage very quickly. The voltage monitor 26 detects this removal of voltage and sends a new signal level to the logic circuits 14 which in turn send new signal levels to regulated power converters 20 and 22, crowbarring their output voltages. The voltage monitor 26 detects a change in the voltages of regulated power converters 20 and 22 and sends new signal levels to the logic circuits 14 which in turn remove the latch-up to the power switch 12, change the display on the power control panel 10, and send a new signal level to the peripheral unit.

Each regulated power converter 16–24 has two or more fuses depending on the power output load requirements. One blown fuse does not necessarily affect the performance of a regulated power converter, unless its percentage output power error is well above the percentage of the total number of fuses which are blown in a given converter. It will be noted that for the regulated power converters to be described herein, input fuses are not blown by a shorted or over-loaded output.

Automatic removal of power from an entire frame or subsystem takes place only when signal levels generated in the voltage monitor 26 due to fault conditions in the frame's regulated power converters 16–24 occur, or when fault conditions in the power switch and inrush current limiter 12 occur. A blown fuse in a regulated power converter 16–24, meaning one converter module has failed, or a signal level generated in the voltage monitor 26 due to its own failure, does not cause automatic removal of power but merely causes an alarm which is displayed on the power control panel 10 and sent to the peripheral unit and remote alarm indicators.

Regulated power converters that are crowbarred have their output voltages removed approximately 500 times faster than if they had their input source switched-off while 100 percent loaded. This crowbarring allows the turn-off cycle to still go through its proper sequence in the event of an automatic removal of power due to the output voltage of one regulated power converter 16–24 deviating from its specified limits, or due to a fault condition occurring in the power switch and inrush current limiter 12, or due to an input power source outage.

The power control panel 10 consists of a conventional three-button, mechanically-interlocking, multiple-contact switch and four indicating lamps. The three buttons are identified as REQ (request), ON, and OFF. The ON and OFF sections of the switch are momentary while the REQ section is locking. Because of a mechanical interlock, neither the ON nor the OFF button can be activated until the REQ button is depressed (which resets itself after either the ON or OFF button have been pressed). All three sections of the switch have two or more isolated contacts; thus allowing either ground potential or −50 volt conventional telephone central office battery to be switched, thereby keeping logic hardware to a minimum.

One lamp on the power control panel 10, when lighted, signifies that the frame is out of service. Another, when lighted, signifies trouble in the frame. The two other lamps, when lighted, signify that either of the duplicated sub-systems power is in the ON state.

Figure 2:
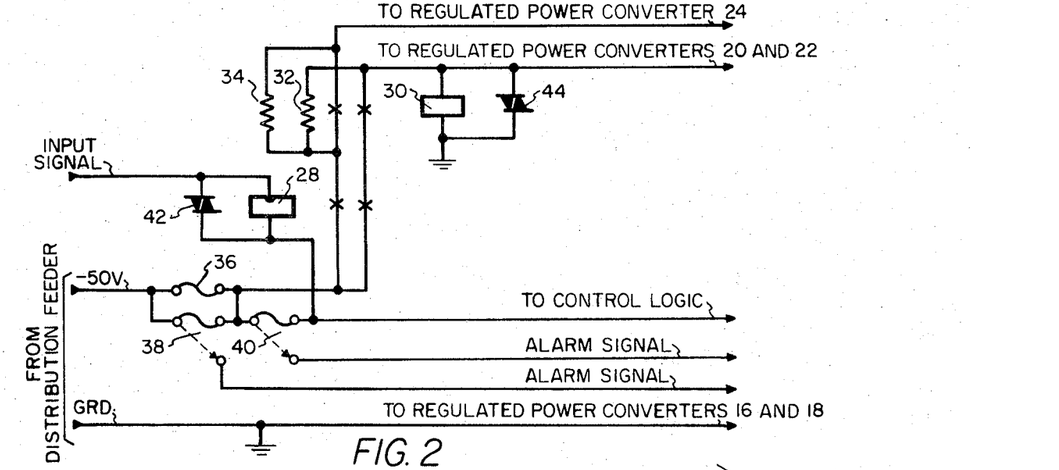
FIG. 2 is a schematic diagram of the power switch and inrush current limiter circuit of FIG. 1.

A schematic diagram of the power switch and inrush current limiter circuit, used in the system of FIG. 1, is shown in FIG. 2. Relay 28 operates as a power switch while relay 30 performs the inrush current limiting function. Both are heavy duty relays and take a relatively long time (i.e., milliseconds) to close their contacts. When relay 28 energizes, power is applied to the regulated power converters through resistors 32 and 34, thus limiting the inrush current. Relay 30 does not have any power to energize until the contacts of relay 28 have closed, and then its power source builds-up slowly due to input filter capacitors in the regulated power converters. The voltage build-up across relay 30 is dependent on the value of resistor 32 and the number and loading of regulated power converters obtaining their inrush current through resistor 32. It is preferred that only one value (e.g., 2 ohms) for resistors 32 and 34 be used and that the number and loading of the regulated power converters obtaining their inrush current through resistor 32 be manipulated to provide the desired voltage build-up across relay 30.

Since one or more independent electronic systems may be housed in a single equipment frame, to permit the survival of one system during a fault situation in the other, separate input power fuses 36-40 or circuit breakers are provided. The fuses or breakers are of the conventional alarm indicating type to provide a signal for an alarm system (not shown). The total current drain of an overall electronic system may, if desired, be further divided among a plurality of lower rated alarm indicating fuses (not shown). Both levels of circuit protection (input fuse or individual circuit fuse) are selected to provide overcurrent protection to the associated wiring and apparatus and to safely interrupt large short circuit currents, which in the telephone system application of this invention potentially may reach levels in excess of 1,000 amperes at an equipment frame. The power switch and inrush current limiter circuit is coupled across the −50 vdc central office battery supply distribution feeder and input control signals from the power control panel 10 and logic circuits 14 of FIG. 1 are applied via a varistor 42 which operates as a spark suppressor across the winding of relay 28. A similar varistor 44 is coupled in parallel with relay 30 for the same purpose.

The logic circuits shown in FIG. 1 may be of the relay type since there is no great need for speed. Speed requirements for the logic functions are determined by the relatively long response time of the regulated power converters; i.e., switching-off or switching-on the −50 volt input to any individual regulated power converter causes its output voltage to have a decay or rise time appreciably longer than the response time of a relay. Simple relay logic circuits, being able to meet the speed requirements, have been found by the Applicants to perform satisfactorily with a minimum number of logic elements and a great deal of reliability.

Figure 3:
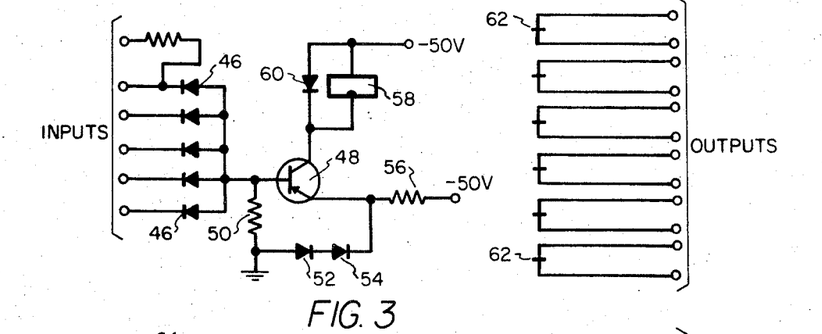
FIG. 3 is a schematic diagram of a first logic element of use in the system of FIG. 1.

FIG. 3 is a schematic diagram of a seven input NOR logic element having six isolated outputs and which may be used to advantage in the practice of the present invention. Five individual signal levels representative of regulated power converter output errors which are generated in the voltage monitor circuit 26 of FIG. 1 are applied via diodes 46 in parallel to the base of PNP transistor 48 which is also coupled to ground potential through resistor 50 and to the emitter of transistor 48 through first and second diodes 52 and 54. The emitter lead is coupled via resistor 56 to the −50 vdc central office battery. The collector of transistor 48 is coupled through relay 58 to −50 vdc in parallel with diode 60. An input signal will cause transistor 48 to conduct current through relay 58 thus opening the normally closed contacts 62.

Figure 4:
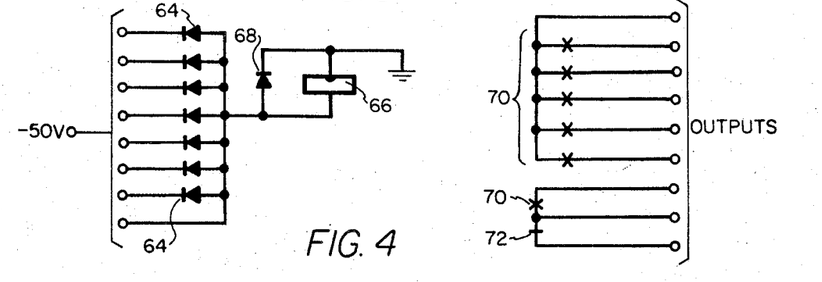
FIG. 4 is a schematic diagram of a second portion of the control logic of FIG. 1.

Turning to FIG. 4 there is shown in schematic form an eight input OR logic of utility in the logic circuitry 14 of FIG. 1. Eight −50 vdc signal levels may be coupled via diodes 64 to the winding of relay 66 which is further coupled in parallel with diode 68 to ground potential. The application of −50 vdc operates relay 66 closing normally open contacts 70 to provide five normal isolated outputs and opening the normally closed contacts 72 to provide an isolated inverted output.

Figure 5:
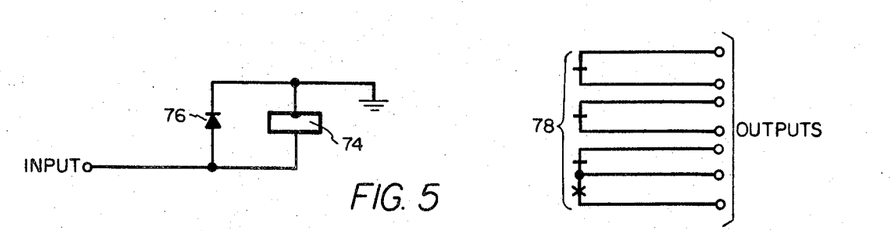
FIG. 5 is a schematic diagram of a third portion of the control logic of FIG. 1.

FIG. 5 illustrates an inverting logic element wherein the application of an input signal to relay 74 in parallel with diode 76 operates the contacts 78 thus providing isolated normal as well as isolated inverted outputs.

Unused inputs on any of the three logic elements illustrated in FIGS. 3–5 need no strapping, and in addition to generating their logic functions, may be used to drive the power switch, inhibit and crowbar the regulated power converters, drive indicator lamps, and send information to the peripheral unit; without the necessity of interfacing circuitry. Because of the response times involved, contact bounce, generated by the manual switches in the power control panel and in the relays, may be disregarded. Since multiple isolated outputs are available in all three logic elements, AND or NAND logic functions can be realized by simple tying outputs in a series string, thereby keeping the number of logic elements to a minimum.

Figure 6:
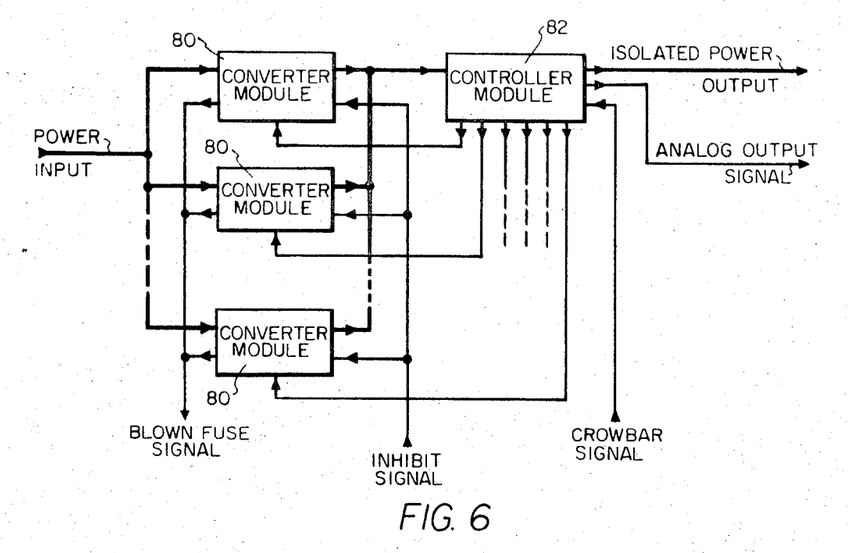
FIG. 6 is a block diagram of a regulated dc-to-dc power converter useful in the system of FIG. 1.

The regulated power converters 16–24 of FIG. 1 are of the dc-to-dc type disclosed in U.S. Pat. No. 3,515,974 which issued to Frederick A. Stich on June 2, 1970, and are illustrated only in a functional block diagram form in FIG. 6. Each regulated power converter consists of two or more converter modules 80, plus one controller module 82. Although each converter module 80 is inherently output current limiting and can work into a short-circuit continuously, without self-destruction, it may be provided with an individual input fuse (not shown) of the alarm indicating type in case of a catastrophic failure. It is preferred that all fuse alarm leads be coupled in parallel such that only one signal lead is extended from each regulated power converter. Each converter module 80 can be individually inhibited; however, it is preferred that all inhibit leads for each regulated power converter be coupled in parallel such that only one signal lead extends to each. Each converter module 80 is thus inhibited whenever its inhibit signal lead has not path to battery ground. Each controller module 80 provides an analog output signal or current level which is proportional to the regulated power converter output voltage. This analog signal is fed to the voltage monitor which analyzes the accuracy of the output voltage.

Figure 7:
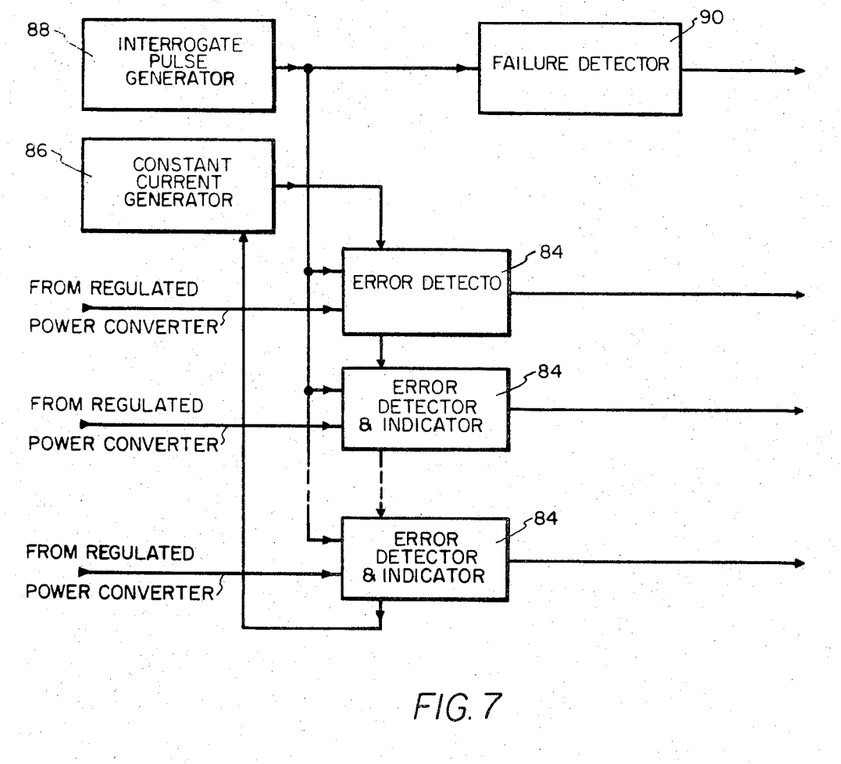
FIG. 7 is a block diagram of the voltage monitor shown in FIG. 1.

A block diagram of the voltage monitor circuit 26, shown in FIG. 1 is illustrated in FIG. 7. The power source for the voltage monitor circuit is the −50 volt office battery and the circuit may be provided with an alarm type fuse (not shown). Each voltage monitor circuit can handle up to eight (only three being shown) separate analog input current signals. The input signals are precision analog current levels which are proportional to the regulated power converter output voltages. In the voltage monitor each of the eight separate precision analog input current levels are magnetically compared in an error detector and indicator circuit 84 to a precision reference current provided by a constant current generator 86. Input current levels within a selected percentage (e.g., ± 3 percent) of the precision reference current will not cause respective output signal levels to be generated while current levels deviating more than a second selected percentage (e.g., ± 6 percent) from the precision reference current must cause the respective output error signal levels to be generated.

As long as the reference current from the constant current generator 86 and the individual currents from the regulated power converters are within the accepted percentage of each other, bipolar pulses from an interrogate pulse generator 88 are magnetically blocked in the error detector and indicator circuits 84 but as the difference becomes slowly greater, depending on individual tolerances of the magnetic units, ranging up to a maximum acceptable level, suddenly the pulses from the interrogate pulse generator 88 see only the pulse integrating network of the error detector and indicator circuit 84. The bipolar pulses from the interrogate pulse generator 88 make the sudden disappearance of magnetic blocking possible. The little hysteresis in the current sensors of an error detector and indicator circuit 84 is responsible for preventing oscillations in the output when a very slow-changing analog input current level is applied.

The output of the interrogate pulse generator 88 may also be coupled to an interrogate pulse generator failure detector and indicator circuit 90 which generates an alarm signal in the event that bipolar pulses cease being received.

Figure 8:
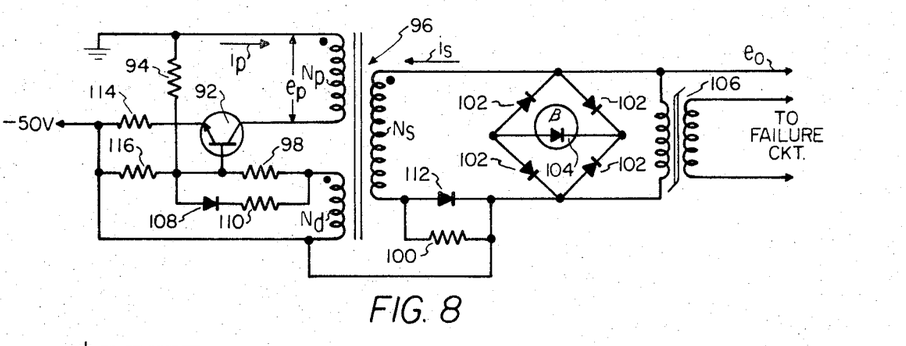
FIG. 8 is a schematic diagram of an interrogation pulse generator circuit of use in the voltage monitor of FIG. 7.
Figure 9:
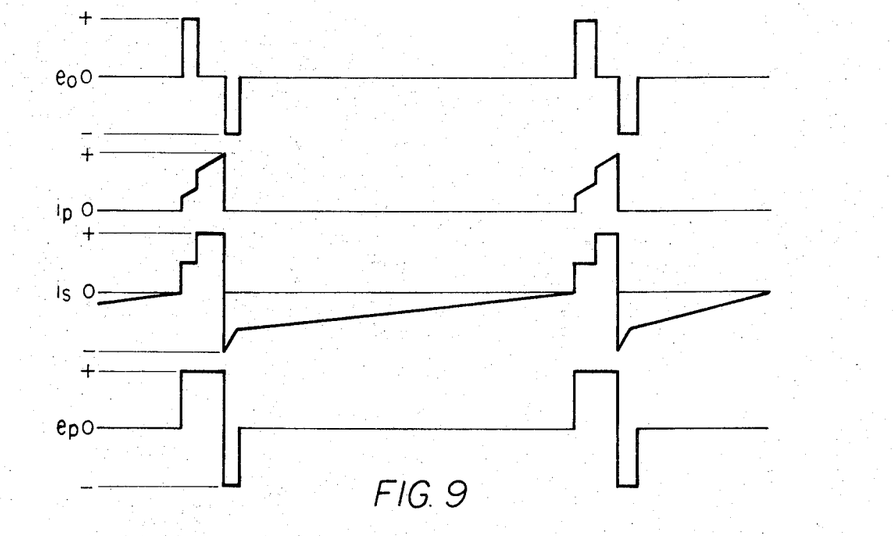
FIG. 9 is a diagram of the waveforms produced in the circuit of FIG. 8.

Turning to FIGS. 8 and 9 there is schematically illustrated a detailed view of the interrogate pulse generator 88 of FIG. 7. This circuit provides the bipolar pulses to the error detector and indicator circuits 84 of FIG. 7 and is essentially a blocking oscillator. Initially transistor 92 is turned on by means of a biasing current provided through resistor 94. This produces a positive voltage at the dot on winding $N_D$ of transformer 96 which in turn produces an increased forward bias through resistor 98 causing transistor 92 to latch into conduction. Current from the secondary winding $N_S$, flows through resistor 100 and the pulse shaping network consisting of a bridge rectifier 102-zener diode 104 combination and saturable transformer 106. The bipolar pulses (FIG. 9) are symmetrically clipped to the proper voltage amplitude by zener diode 104, in conjunction with the bridge rectifier and chopped to the proper time duration by saturable transformer 106. After transformer 106 saturates, the entire secondary voltage appears across resistor 100. Transistor 92 continues to conduct with a collector current increasing at a rate determined by the primary inductance of transformer 96 until the forward bias is no longer sufficient to maintain transistor 92 in saturation. Then the primary voltage of transformer 96 decreases which also decreases the forward bias on transistor 92, initiating a bootstrap turn-off process. Diode 108 and resistor 110 enhance the turn-off of transistor 92 through the polarity reversal occurring in transformer 96. The energy stored in the magnetic field of transformer 96 is released through the secondary winding. The secondary current now flows through diode 112 and the pulse shaping network; negative polarity portions of the bipolar pulses being clipped to the same voltage amplitude and time duration as were the positive portions. After transformer 106 saturates, the secondary voltage of transformer 96 is clipped by diode 112 to its forward voltage drop, which determines the length of time before transistor 92 returns to conduction since most of the magnetic field energy in transformer 96 must be dissipated before transistor 92 has forward bias restored. Resistors 114 and 116 stabilize the characteristics of transistor 92 such that the frequency of the bipolar pulses is not temperature dependent, and no manual adjustment is necessary for different transistors.

Figure 10:
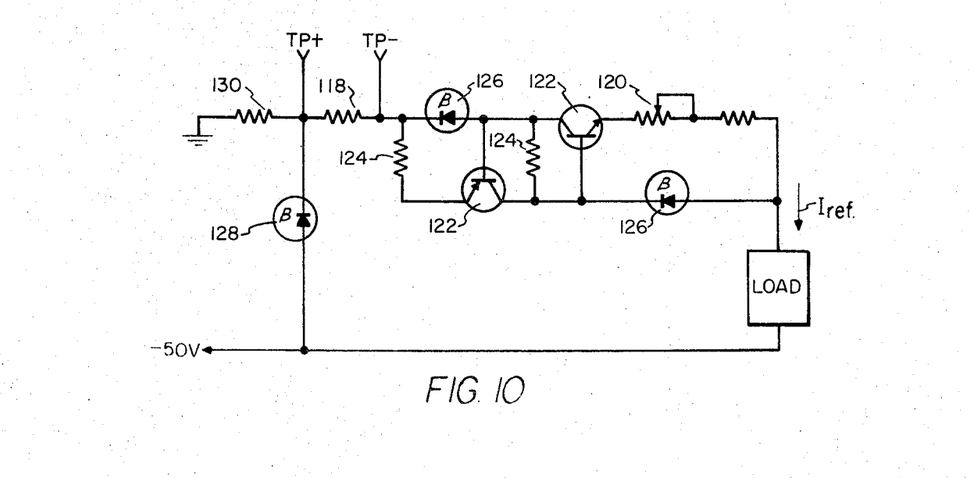
FIG. 10 is a schematic diagram of a constant current generator circuit of use in the voltage monitor of FIG. 7.

FIG. 10 is a schematic diagram of a constant current generator which provides the precision reference current which is fed in series to all error detectors and indicator circuits 84 of FIG. 7. When the voltage drop across precision i.e., 0.1 percent) resistor 118 is adjusted by variable resistor 120 to a preselected voltage (e.g., 1.000 volt), the constant current generator provides a precision reference current of a given level (e.g., 50 milliamperes).

Two conventional current regulators each comprising a transistor 122, resistor 124 and zener reference diode 126, are connected together in such a manner that each provides a constant current to the other's zener reference diode 126. The sum of both current regulator's output current is thus the constant current reference. This arrangement wherein each current regulator carries only half the output provides a very stable current reference. The temperature coefficients of the two conventional current regulators oppose each other resulting in a composite generator that is very temperature insensitive. Line regulation in this constant current generator circuit is enhanced by providing the pre-regulating network zener diode 128 and resistor 130. A limited amount of adjustment of the precision reference current is provided by potentiometer 120.

Figure 11:
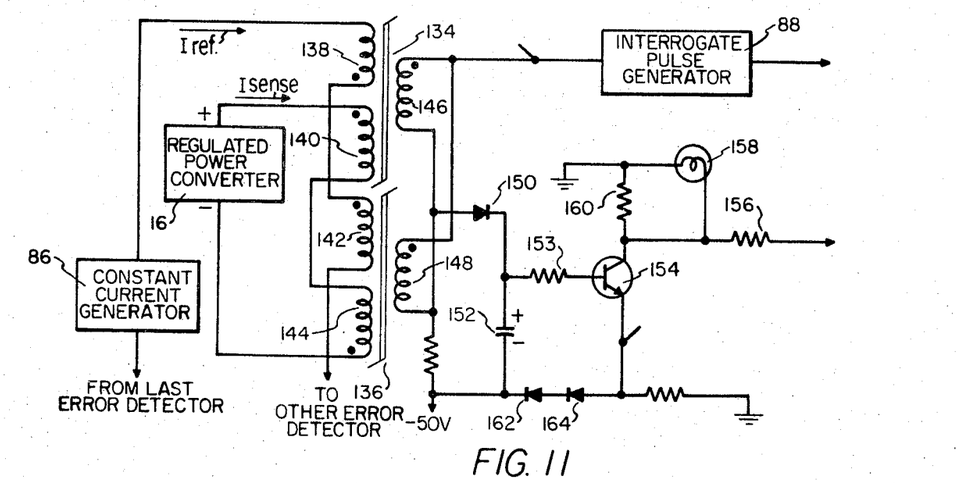
FIG. 11 is a schematic diagram of an error detection and indicator circuit for use in the apparatus of FIG. 7.

FIG. 11 is a schematic diagram of one error detector and indicator circuit that compares the analog current level from one regulated power converter, e.g., 16, to the precision reference current from the constant current generator 86, indicates the status of the comparison and generates a corresponding error signal. The two saturable transformers 134 and 136 are provided, the former for high current detection and the latter for low current detection. The precision reference current flows through series-connected primary windings 138 and 142 of transformers 134 and 136. The allowable deviation envelope for the analog input current levels is determined by the difference in the number of turns on windings 138 and 142 or windings 140 and 144 of transformers 134 and 136 respectively. In one embodiment constructed by the applicants a deviation envelope of 8 percent was obtained by winding 138 of transformer 134 with 104 turns and winding 142 of transformer 136 with 96 turns while windings 140 and 144 of both transformers were 100 turns each.

Figure 12:
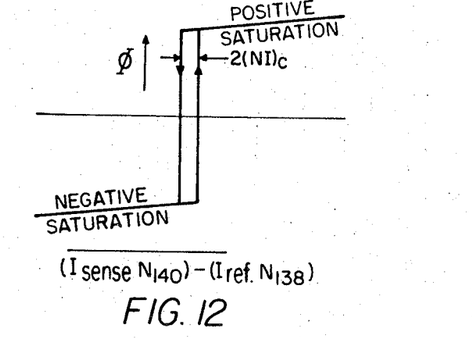
FIGS. 12 and 13 represent the dc hysteresis loops for the transformers shown in FIG. 11.
Figure 13:
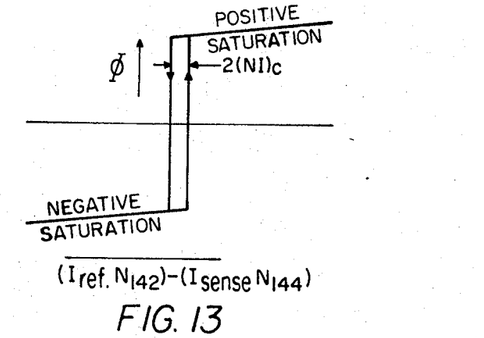

For the purposes of illustration it may be assumed that current flowing into the dot-side of a winding will tend to put the magnetic core into a positive saturated state. Referring specifically to transformer 134, if the reference ampere-turns ($I_{ref}N_{138}$) are slightly greater than the sense ampere-turns ($I_{sense}N_{140}$), then the core is in negative saturation. The d-c hysteresis loop for transformer 134 is shown in FIG. 12. If the core of transformer 134 is in negative saturation, then a positive pulse applied at the dot-side of the secondary winding 144 will be blocked. When the analog input current from the regulated power converter increases such that ($I_{sense}N_{140}$) becomes greater than ($I_{ref}N_{138}$), the core of transformer 134 will change its state to positive saturation and the positive pulses applied at the dot-side of winding 146 will be passed. Therefore, transformer 134 senses high current deviations. The d-c hysteresis loop for transformer 136 is shown in FIG. 13. In this case, positive saturation (pulse-passing state) occurs when ($I_{ref}N_{142}$ is greater than ($I_{sense}N_{144}$). Therefore, transformer 136 senses low current deviations.

Figure 14:
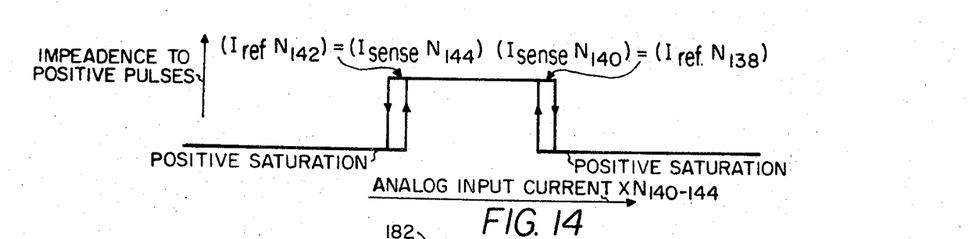
FIG. 14 is a representation of the combined characteristic of the transformers shown in FIG. 11.

FIG. 14 is an idealized sketch of the combined characteristics of transformers 134 and 136 as seen by a positive pulse applied at the dot-side of windings 146 and 148. Positive pulses passed by the parallel windings 146 and 148 of transformers 134 and 136 respectively will be coupled via diode 150 to capacitor 152, which operates as an integrator. The integrated signal is coupled through resistor 153 to the base of transistor 154. This transistor conducts, providing a $-50$ volt signal through resistor 156 and a current path for an indicator lamp 158 coupled to the collector of transistor through resistor 160. The two diodes 162 and 164, provide a negative bias for the base of transistor 154 such that its switching time is increased when the transistor is turned off.

Figure 15:
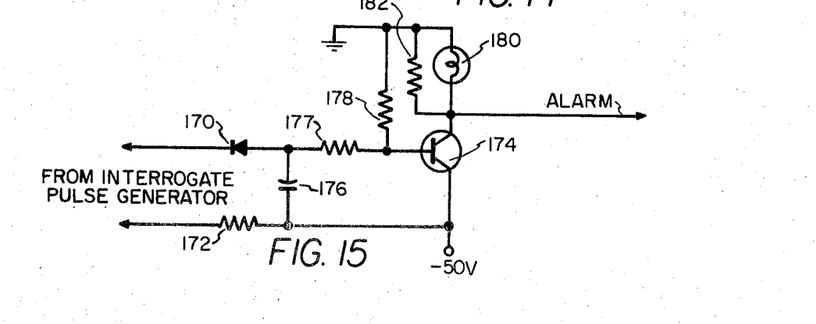
FIG. 15 is a schematic diagram of the interrogate pulse generator failure detector and indicator circuit shown in FIG. 7.

Finally, FIG. 15 is a schematic diagram of the interrogate pulse generator failure detector and indicator circuit which provides alarm information in case the interrogate pulse generator 88 of FIG. 7 stops producing its bipolar output pulses. Proper operation of the interrogate pulse generator guarantees the presence of a reverse bias voltage via diode 170 and resistor 172 for transistor 174 across capacitor 176 and through resistor 177. If the pulses cease for a few milliseconds, transistor 174 is forward biased through resistor 178 and the failure indicator lamp 180 coupled across resistor 182 is lit as well as the alarm signal generated.

From the foregoing description it will be seen that the applicants have provided a new and novel power control and supervisory system wherein the objectives set forth hereinabove are efficiently achieved. Since certain changes in the above construction will occur to those skilled in the art without departure from the scope of the invention it is intended that all matter contained in the description or shown in the appended drawings shall be interpreted as illustrative and not in a limiting sense.

Having described what is new and novel and desired to secure by Letters Patent, what is claimed is:

1. A power control and supervisory system comprising a plurality of regulated dc-to-dc power converters each converter including an output inhibiting means and a crowbar protective means, a source of direct current potential coupled to the power input of each of said plurality of regulated power converters, means for sampling the output voltage of each of said regulated power converters, comparing said output voltage to a preselected standard voltage and generating a control signal when the output voltage of any one of said regulated power converters differs from said standard voltage by a preselected amount, switching means coupled to said sampling means and to the inhibiting means and crowbar protective means of each said regulated power converters, and operative in response to a control signal from said sampling means to selectively couple inhibiting and crowbar control signals to each of said regulated converters in a predetermined sequence, and a power switch coupled between said source of direct current potential and said plurality of regulated power converts, coupled to said switching means, and operative in response to signals from said switching means to selectively apply said direct current potential to the power inputs of all of said plurality of regulated power converters.

2. Apparatus as recited in claim 1 wherein said plurality of regulated power converters are arranged in groups, each converter in a group having a similar output voltage, and said switching means selectively couples said inhibiting signals to each group of converters in a predetermined sequence and selectively couples said crowbar control signals to each group of converters in a reverse sequence.

3. Apparatus as recited in claim 2 further including manual control means coupled to said switching means and to said power switch for initiating application and removal of said direct current potential to the power inputs of all said plurality of regulated power converters and to initiate the sequential coupling of said inhibiting and said crowbar control signals to each said group of regulated power converters.

4. Apparatus as recited in claim 1 wherein said sampling means comprises a substantially constant current generator,
   a source of interrogating pulses, and a plurality of error detection means, one coupled to the output of each of said regulated power converters, and each coupled to said constant current generator and to said source of interrogating pulses, operating to compare the output of said regulated power converter with the output of said constant current generator, and transmit interrogating pulses from said pulse generator only when said outputs differ by an amount in excess of a preselected level.

5. Apparatus as recited in claim 4 wherein
said switching means operates in response to a pulse transmitted by any one of said error detection means to selectively couple said inhibiting signals and said crowbar control signals to said regulated power converters.

6. Apparatus as recited in claim 4 wherein
said interrogating pulses are bipolar pulses of symmetrical amplitude and time duration, and
each said error detection means comprises first and second saturable transformers each having a first primary winding coupled in series with said current generator and opposite the other, a second primary winding coupled in series with said regulated power converter and opposite the other, and secondary windings coupled at one side to said source of bipolar interrogating pulses and at the other to the output of said error detection means,
the core of said first transformer being in negative saturation when the outputs of said current generator and said regulated power converter are substantially equal and being in positive saturation when the output of said regulated power converter exceeds that of said current generator by a preselected level such that positive portions of said bipolar pulses are transmitted when said preselected level is exceeded, and
the core of said second transformer being in positive saturation when the outputs of said current generator and said regulated power converter are substantially equal and being in negative saturation when the output of said regulated power converter is lower than that of said current generator by a preselected level such that negative portions of said bipolar pulses are transmitted when said preselected level is exceeded.

7. Apparatus as recited in claim 4 further including
means coupled to said source of interrogating pulses for detecting a failure of said source to produce said pulses, and producing an alarm signal on the detection of such a failure.

* * * * *